US009202311B2

(12) United States Patent
Chawathe et al.

(10) Patent No.: US 9,202,311 B2
(45) Date of Patent: Dec. 1, 2015

(54) ACCESSING MAP TILES

(71) Applicant: Google Inc., Mountain View, CA (US)

(72) Inventors: Yatin Dilip Chawathe, Seattle, WA (US); Jamie Zyskowski, Seattle, WA (US); Paul Messmer, Issaquah, WA (US); Lakshminath Bhuvanagiri, Bangalore (IN); Haitao Liu, Seattle, WA (US); Chandan Kashinath Shanbhag, Bangalore (IN)

(73) Assignee: Google Inc., Mountain View, CA (US)

( * ) Notice: Subject to any disclaimer, the term of this patent is extended or adjusted under 35 U.S.C. 154(b) by 123 days.

(21) Appl. No.: 13/761,026

(22) Filed: Feb. 6, 2013

(65) Prior Publication Data

US 2015/0170387 A1 Jun. 18, 2015

Related U.S. Application Data

(60) Provisional application No. 61/597,689, filed on Feb. 10, 2012.

(51) Int. Cl.
*G06T 11/40* (2006.01)
*G06T 17/05* (2011.01)

(52) U.S. Cl.
CPC ................. *G06T 17/05* (2013.01); *G06T 11/40* (2013.01)

(58) Field of Classification Search
CPC ......... G06T 15/005; G06T 15/04; G06T 1/20; G06T 1/60; G06T 3/4038; G06T 11/60; G06T 5/20; G06T 9/007; G09G 5/363; H04N 7/26563; H04N 7/26579; G06F 17/30265; G06F 17/30247
USPC ......... 345/522, 552, 419, 420, 619, 660, 636; 382/302, 305, 284, 240; 701/451; 711/119
See application file for complete search history.

(56) References Cited

U.S. PATENT DOCUMENTS

| | | | | |
|---|---|---|---|---|
| 7,965,902 | B1 * | 6/2011 | Zelinka et al. | 382/284 |
| 8,270,741 | B1 * | 9/2012 | Zelinka et al. | 382/240 |
| 8,346,016 | B1 * | 1/2013 | Zelinka et al. | 382/284 |
| 8,660,386 | B1 * | 2/2014 | Zelinka et al. | 382/302 |
| 8,681,176 | B1 * | 3/2014 | Maurer et al. | 345/619 |
| 8,711,181 | B1 * | 4/2014 | Nourse et al. | 345/660 |
| 8,731,823 | B2 * | 5/2014 | Schunder et al. | 701/451 |
| 8,937,627 | B1 * | 1/2015 | Otero et al. | 345/619 |
| 2007/0229524 | A1 * | 10/2007 | Hendrey et al. | 345/552 |
| 2007/0233367 | A1 * | 10/2007 | Chen et al. | 701/207 |
| 2010/0321399 | A1 * | 12/2010 | Ellren et al. | 345/522 |
| 2011/0131376 | A1 * | 6/2011 | Fischer | 711/119 |
| 2013/0147842 | A1 * | 6/2013 | Zhu et al. | 345/636 |
| 2013/0321400 | A1 * | 12/2013 | van Os et al. | 345/419 |

(Continued)

*Primary Examiner* — Chante Harrison
(74) *Attorney, Agent, or Firm* — Dority & Manning, P.A.

(57) ABSTRACT

The subject matter of this specification can be implemented in, among other things, a computer-implemented method for accessing map tiles. The method includes receiving a first request from a computing device for a portion of a map. The portion of the map includes combined map tiles that are a combination of corresponding ones of first map tiles from a first type of map and second map tiles from a second type of map. The method further includes providing first tile version identifiers and second tile version identifiers to the computing device in response to receiving the first request. The method further includes providing instructions to the computing device for using the first tile version identifiers and the second tile version identifiers to request the combined map tiles.

14 Claims, 7 Drawing Sheets

(56) References Cited

U.S. PATENT DOCUMENTS

2013/0321401 A1* 12/2013 Piemonte et al. ............ 345/419
2013/0328862 A1* 12/2013 Piemonte ..................... 345/419
2013/0328871 A1* 12/2013 Piemonte et al. ............ 345/420
2013/0346855 A1* 12/2013 Appleton et al. ............ 715/273

* cited by examiner

ACCESSING MAP TILES

CROSS-REFERENCE TO RELATED APPLICATIONS

This application claims priority from U.S. Provisional Application No. 61/597,689, filed Feb. 10, 2012, and entitled "Accessing Map Tiles," which is incorporated herein by reference.

TECHNICAL FIELD

This instant specification relates to tile based mapping systems.

BACKGROUND

Many online mapping systems use tiles to represent portions of a map. A mapping system can use images, such as satellite and aerial images, for the map tiles. The mapping system can also generate the map tiles using vector data that describes geographic features, such as data from a geographic information system (GIS). Typically, rendering a set of map tiles from vector data for a large or complex map can take a significant amount of time, such as days or even weeks.

Once map tiles have been rendered, a client computing device can then download the map tiles from the mapping system and arrange the downloaded map tiles for display in an application window. The map often includes multiple zoom levels, where each map tile in a low, zoomed-in level represents a smaller portion of the map than each tile in a higher, zoomed-out level. In some cases, as a user pans and zooms through the map, the client computing device downloads additional map tiles from the mapping system for display in the application window.

SUMMARY

In one aspect, a computer-implemented method for accessing map tiles includes receiving a first request from a computing device for a portion of a map. The portion of the map includes combined map tiles that are a combination of corresponding ones of first map tiles from a first type of map and second map tiles from a second type of map. The first map tiles from the first type of map include bulk rendered map tiles and one or more individual rerendered map tiles. The method further includes providing first tile version identifiers and second tile version identifiers to the computing device in response to receiving the first request. Each of the first tile version identifiers uniquely identifies an instance of one of the first map tiles and each of the second tile version identifiers uniquely identifies an instance of one of the second map tiles. The method further includes providing instructions to the computing device for using the first tile version identifiers and the second tile version identifiers to request the combined map tiles.

Implementations can include any, all, or none of the following features. The first tile version identifiers can each include a bulk tile version identifier and an individual tile version identifier. The method can include receiving one or more second requests from the computing device for the combined map tiles using the first tile version identifiers and the second tile version identifiers. The method can include providing the combined map tiles to the computing device in response to receiving the second requests. Providing the instructions for using the first tile version identifiers and the second tile version identifiers to request the combined map tiles can include providing instructions to include the first tile version identifiers and the second tile version identifiers in corresponding path portions of web addresses in the second requests. The method can include combining the corresponding ones of the first map tiles and the second map tiles to generate the combined map tiles. The method can include determining that at least a threshold amount of time has passed after generating the individual rerendered map tiles. Combining the corresponding ones of the first map tiles and the second map tiles can include combining one or more corresponding ones of the bulk rendered map tiles rather than the individual rerendered map tiles with the second map tiles in response to determining that the threshold amount of time has passed. The method can include providing instructions to the computing device for displaying the combination of the corresponding ones of the first map tiles and the second map tiles. The method can include determining that at least a threshold amount of time has passed after generating the individual rerendered map tiles. Providing the instructions for displaying the combination of the corresponding ones of the first map tiles with the second map tiles can include providing instructions for displaying the combination of one or more corresponding ones of the bulk rendered map tiles rather than the individual rerendered map tiles with the second map tiles in response to determining that the threshold amount of time has passed. The method can include providing additional first tile version identifiers of the first map tiles and additional second tile version identifiers of the second map tiles to the computing device for one or more additional combined map tiles around the combined map tiles and instructions for using the additional first tile version identifiers and the additional second tile version identifiers to request the additional combined map tiles. The method can include distributing the first map tiles and the second map tiles to multiple map tile servers.

In one aspect, a computer-implemented system for accessing map tiles includes one or more data storages that store combined map tiles that are a combination of corresponding ones of first map tiles from a first type of map and second map tiles from a second type of map. The first map tiles from the first type of map include bulk rendered map tiles and one or more individual rerendered map tiles. The system further includes a first interface that receives a first request from a computing device for a portion of a map that includes the combined map tiles. The system further includes a map server that provides first tile version identifiers and second tile version identifiers to the computing device in response to receiving the first request, and provides instructions to the computing device for using the first tile version identifiers and the second tile version identifiers to request the combined map tiles. Each of the first tile version identifiers uniquely identifies an instance of one of the first map tiles and each of the second tile version identifiers uniquely identifies an instance of one of the second map tiles.

Implementations can include any, all, or none of the following features. The first tile version identifiers can each include a bulk tile version identifier and an individual tile version identifier. The system can include a second interface that receives one or more second requests from the computing device for the combined map tiles using the first tile version identifiers and the second tile version identifiers. The system can include a map tile server that provides the combined map tiles to the computing device in response to receiving the second requests. The map server can provide instructions to include the first tile version identifiers and the second tile version identifiers in corresponding path portions of web addresses in the second requests. The system can include a tile renderer that combines the corresponding ones of the first map tiles and the second map tiles to generate the combined map tiles. The tile renderer can determine that at least a threshold amount of time has passed after generating the individual rerendered map tiles, and can combine one or more corresponding ones of the bulk rendered map tiles rather than the individual rerendered map tiles with the second map tiles in response to determining that the threshold amount of time has passed. The map server can provide instructions to the computing device for displaying the combination of the corresponding ones of the first map tiles and the second map tiles. The map server can determine that at least a threshold amount of time has passed after generating the individual rerendered map tiles, and can provide instructions for displaying the combination of one or more corresponding ones of the bulk rendered map tiles rather than the individual rerendered map tiles with the second map tiles in response to determining that the threshold amount of time has passed. The map server can provide additional first tile version identifiers of the first map tiles and additional second tile version identifiers of the second map tiles to the computing device for one or more additional combined map tiles around the combined map tiles and instructions for using the additional first tile version identifiers and the additional second tile version identifiers to request the additional combined map tiles. The system can include multiple map tile servers that provide the combined map tiles to the computing device in response to receiving one or more second requests for the combined map tiles using the first tile version identifiers and the second tile version identifiers. The system can include a tile renderer that distributes the first map tiles and the second map tiles to the map tile servers.

The details of one or more implementations are set forth in the accompanying drawings and the description below. Other features and advantages will be apparent from the description and drawings, and from the claims.

DETAILED DESCRIPTION

This document describes systems and techniques for accessing and managing updates to map tiles. The system receives updates to one or more features in geospatial information that describes a map. The system includes map tiles that are rendered from the geospatial information. In response to receiving the updates, the system rerenders one or more of the map tiles for portions of the map that correspond to the updated features. The system associates the rerendered map tiles with identifiers that allow computing devices to request a download of specific instances of the rerendered map tiles over a network. In some implementations, the rerendered map tiles and identifiers can be used to replace temporary display objects while editing a map. Identifiers for instances of a map tile can also be used to control caching of the instances of the map tile within the network, such as at a computing device that requested the map tile or an intermediate computing device between the map system and the computing device that requested the tile.

Figure 1:
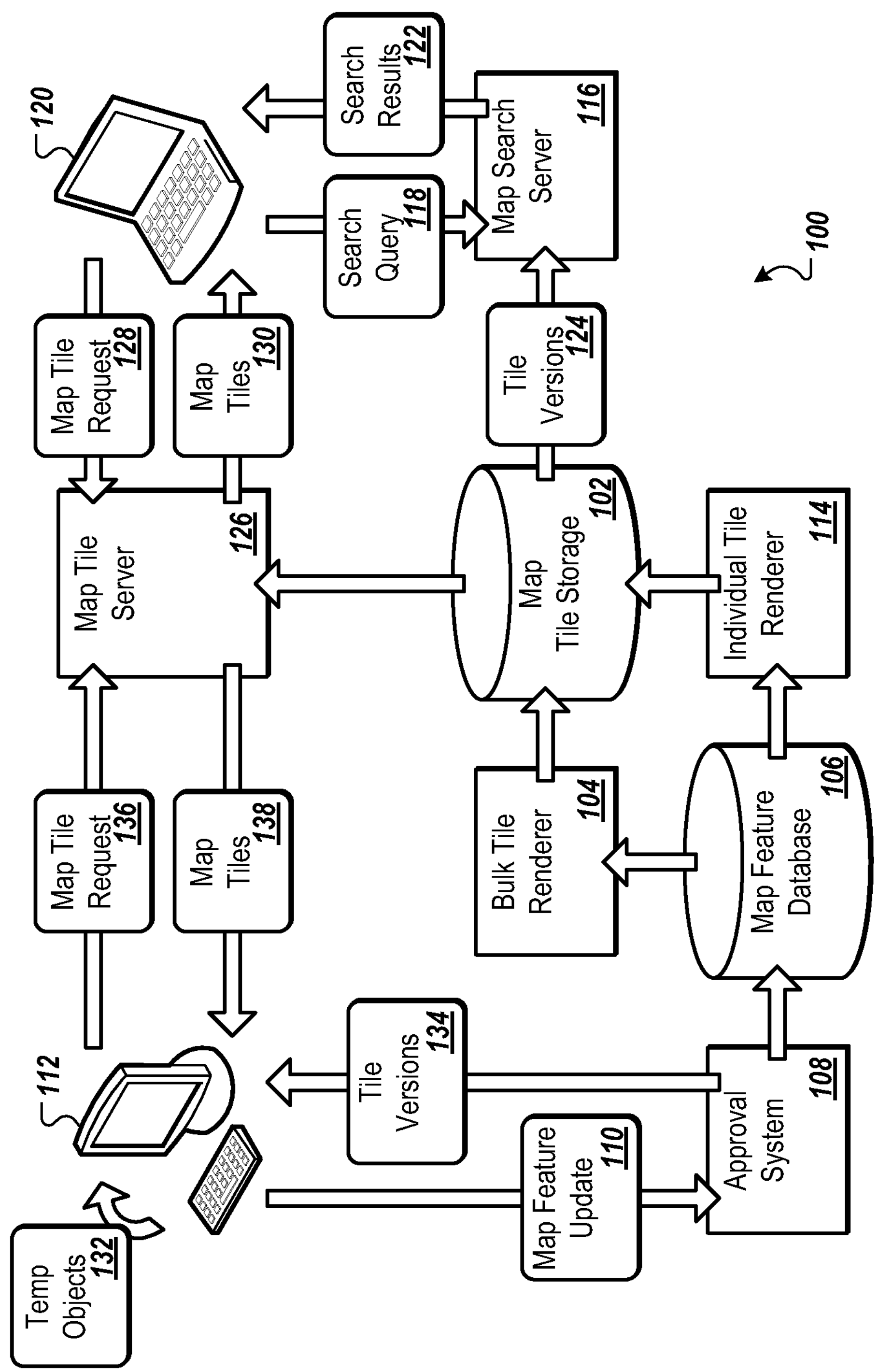
FIG. 1 is a schematic diagram that shows an example of a system for accessing and managing updates to map tiles.

FIG. 1 is a schematic diagram that shows an example of a system 100 for accessing and managing updates to map tiles. The system 100 includes a map tile storage 102 that stores rendered map tiles. A bulk tile renderer 104 retrieves features from a map feature database 106 and processes the features to render the map tiles. Features may include, for example, a polyline that describes a road or a boundary of a geographical feature, such as a body of water. The map feature database 106 may include features for multiple maps, such as a topographical map and a street map. The bulk tile renderer 104 may then render map tiles for the multiple maps. In addition, the bulk tile renderer 104 may render map tiles for multiple zoom levels of the maps, such as about five, ten, or fifteen zoom levels. Each tile may have a particular resolution, such as two hundred fifty-six by two hundred fifty-six pixels, and each tile at a particular zoom level may represent a different amount of geographical area per tile than tiles of other zoom levels.

An approval system 108 may receive one or more updates 110 to the map features from one or more computing devices 112 over a network, such as a local network or the computing devices that make up the Internet. The approval system 108 validates the updates 110 before storing the updates 110 in the map feature database 106 and making the updates 110 available to an individual tile renderer 114. The approval system 108 may use one or more of an automated approval process, a manual approval process, or a combination of automatic and manual processes.

The individual tile renderer 114 rerenders the tiles that are affected by the updates 110 and stores the rerendered tiles in the map tile storage 102 or another storage system. In some implementations, the individual tile renderer 114 uses the bulk rendered tiles as a starting point for the rerendering. The individual tile renderer 114 may modify the contents of the ones of the bulk rendered tiles that correspond to the updates 110. For example, if the updates 110 indicate that a road has been moved, then the individual tile renderer 114 can rerender the ones of the bulk rendered tiles on which the road previously appeared before applying the updates 110 and the ones of the bulk rendered tiles on which the road now appears after applying the updates 110.

In some implementations, the individual tile renderer 114 and/or the bulk tile renderer 104 store, in the map feature database 106 and/or the map tile storage 102, an association between each map feature and the ones of the tiles on which the map feature appears. The individual tile renderer 114 can then use the association to identify ones of the tiles to be rerendered due to the updates 110 to the corresponding map features.

The individual tile renderer 114 and/or the bulk tile renderer 104 generate tile version identifiers for each of the rendered and/or rerendered instances of the tiles. For example, the bulk tile renderer 104 can generate a bulk tile version for a set of bulk rendered tiles, such as "123," and assign the bulk tile version identifier to the corresponding set of bulk rendered tiles. Each time the bulk tile renderer 104 renders the map tiles for a map in bulk, the bulk tile renderer 104 assigns a new bulk tile version identifier to the new instance of the set of bulk rendered tiles, such as by incrementing the previous bulk version identifier of "123" to "124." The individual tile renderer 114 can generate individual tile versions for the map tiles that are rerendered in response to the update 110 to the map features. The bulk tile version identifiers and individual tile version identifiers uniquely identify instances of the map tiles.

In some implementations, the individual tile renderer 114 includes the bulk tile version, from which the rerendered tiles are based, in the individual tile version. For example, the individual tile renderer 114 can generate an individual tile version that includes the bulk tile version identifier (e.g., "123") and an additional individual tile version identifier (e.g., "0000076"), such as "123000076." The additional portion of the individual tile version identifier may indicate a particular change to the corresponding rerendered tiles measured relative to the bulk version of the tiles. For example, the individual tile renderer 114 may use "76" to indicate that seventy-six changes have been made to the corresponding tiles since bulk tile version "123" or that the corresponding tiles were rerendered during a seventy-sixth time interval after bulk tile version "123."

The individual tile renderer 114 may choose the number of digits allotted for the additional portion of the individual tile version number based on a frequency with which the bulk tile renderer 104 renders each new set of bulk rendered tiles and a frequency with which the individual tile renderer 114 rerenders instances of individual tiles. For example, the bulk tile renderer 104 may render a new set of bulk rendered tiles in a matter of days, such as about every two weeks. The individual tile renderer 114 may rerender new instances of individual tiles in a matter of seconds, such as about ten seconds. The individual tile renderer 114 may represent the number of ten second intervals in a two week period using six digits. In some implementations, the individual tile renderer 114 divides the number of seconds that have elapsed since the last bulk rendering by a particular number, such as ten (e.g., the frequency with which updates occur), to calculate the additional portion of the individual tile version identifier.

In some implementations, separating the bulk rendering and individual tile rendering allows the bulk tile renderer 104 to perform a rendering that consumes more time than the rerendering performed by the individual tile renderer 114. For example, the bulk tile renderer 104 may use a more aggressive compression algorithm than the individual tile renderer 114. In another example, the bulk tile renderer 104 may analyze a larger set of tiles than the individual tile renderer 114 when arranging features within the tiles to avoid collisions between the features. In yet another example, the bulk tile renderer 104 may analyze a larger set of tiles than the individual tile renderer 114 when determining how many features are to be displayed at each zoom level of the tiles (e.g., the feature density at each zoom level).

The bulk tile renderer 104 and the individual tile renderer 114 may store the instances of the bulk rendered tiles and the individually rerendered tiles together in the map tile storage 102 or in separate storage systems. In some implementations, the bulk tile renderer 104 and the individual tile renderer 114 store the instances of the bulk rendered tiles and/or the individually rerendered tiles in multiple storage systems, such as in storage systems that are geographically distributed around a country, a continent, or the Earth.

The system 100 includes a map search server 116 that receives a search query 118 from a computing device 120 over a network, such as a local network or the computing devices that make up the Internet. The map search server 116 processes the search query 118 and, in response, provides one or more search results 122 to the computing device 120. The search query 118 can be for a map search system or a general search query that includes a term that the map search server 116, or another system, identifies as map related. The map search server 116 identifies a location for one or more of the search results 122. The location may include, for example, coordinates in a coordinate system, such as a latitude, a longitude, and a zoom level. The map search server 116 accesses the map tile storage 102, or another storage, to retrieve one or more latest tile versions 124 for a portion of the map that corresponds to the identified location. The map search server 116 provides the search results 122 to the computing device 120, including instructions for requesting a set of map tiles from a map tile server 126 that have the latest tile versions 124.

The computing device 120 receives the search results 122, including the latest tile versions 124. The latest tile versions 124 include one or more instances of the bulk tile version identifier and one or more instances of individual tile version identifiers. The computing device 120 processes the instructions in the search results 122 and as a result, sends a request 128 to the map tile server 126 for map tiles having the latest tile versions 124. In response, the map tile server 126 provides one or more map tiles 130 to the computing device 120. The map tile server 126 may retrieve the bulk and individual map tiles both from the map tile storage 102 or from separate storage systems. In some implementations, multiple map tile servers access multiple corresponding map tile storage systems. Each map tile server may wait a particular amount of time, such as about five, ten, or fifteen minutes, before serving tiles from a corresponding map tile storage to allow rendered and rerendered map tiles to be distributed to the map tile storage systems from a central map tile storage, the bulk tile renderer 104, and/or the individual tile renderer 114. The computing device 120 then receives the map tiles from the map tile server 126 and uses the instructions from the search results 122 to display one or more of the map tiles 130.

In some implementations, the computing device 112 that submitted the updates 110 to the approval system 108 overlays one or more temporary display objects 132 that represent the updates 110 to the map tiles. The computing device 112 may receive one or more tile version identifiers 134 from the approval system 108 for individual instances of the tiles that were rerendered as a result of the updates 110. The computing device 112 then sends a request 136 to the map tile server 126 for the rerendered instances of the tiles using the tile version identifiers 134. In response, the map tile server 126 provides one or more individual rerendered instances of map tiles 138 to the computing device 112. The computing device 112 may use the individual rerendered instances of map tiles 138 to replace existing map tiles and/or the temporary display objects 132.

Figure 2A:
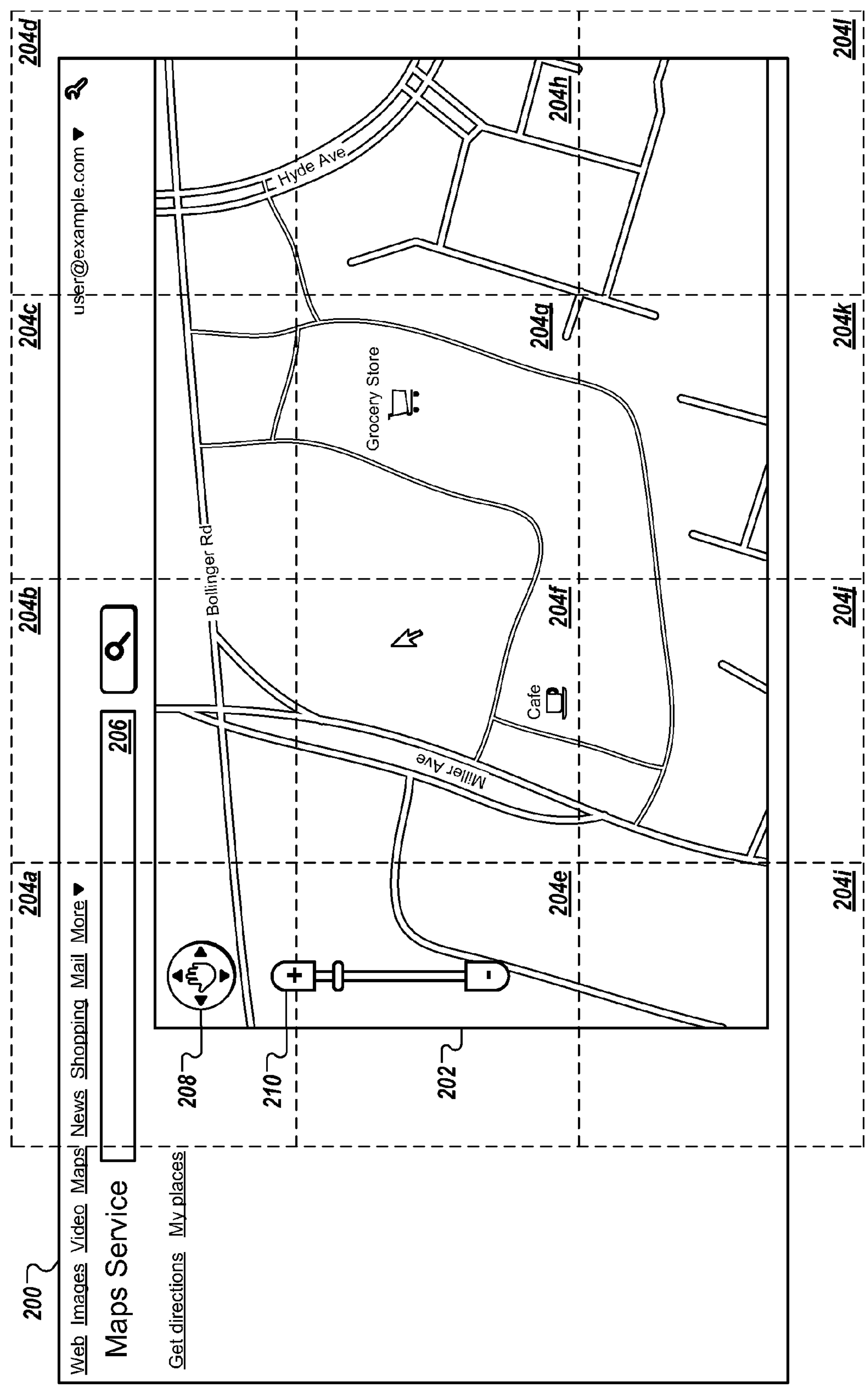
FIG. 2A shows an example of a graphical user interface for presenting updated map tiles.

FIG. 2A shows an example of a graphical user interface 200 for presenting updated map tiles. The graphical user interface 200 is a web page provided by a map search service, such as the map search server 116. The graphical user interface 200 includes a map area 202. The map area 202 presents at least a portion of one or more map tiles 204*a*-1 that make up a map. The map may include other map tiles that are not currently presented within the map area 202, such as map tiles to the left, right, up, down, or on different zoom level than the map tiles 204*a*-1. The dotted lines represent the full extent of each of the map tiles 204*a*-1, but only the portion of each of the map tiles 204*a*-1 that is within the map area 202 is presented to a user in the graphical user interface 200.

The graphical user interface 200 includes instructions from the map search server for downloading the map tiles 204*a*-1 from a map tile server, such as the map tile server 126. The instructions can include, for example, markup and/or script for web page elements, such as a hypertext markup language (HTML) <img> tag for each map tile. Each <img> tag can include a "src" attribute that identifies the network location of the corresponding map tile, such as in a uniform resource identifier (URI). Each URI may include a map tile version identifier of the corresponding map tile. In some implementations, the map tile version identifier is included in a path portion of the URI, where the URI has a format of scheme://domain:port/path?query#fragment. Alternatively, the map tile version identifier may be included in another portion of the URI.

In some implementations, data that describes a map tile version identifier can be provided separately from an element (e.g., an <img> tag) that is used to request the map tile. For example, the data can be in a separate file, such as a file in an Extensible Markup Language (XML) format, or in a portion of a file or web page in which the element is included that is separate from the element. Then, a client-side script (e.g., JavaScript) may be used to populate the element with the map tile version identifier, such as by adding the map tile version identifier to a "src" attribute of an <img> tag.

The instructions for downloading map tiles can set a cache expiration date in the HTTP header for each request to a time in the distant future, such as a time that is greater than the longest typical update for a map tile (e.g., more than about two weeks). This encourages the requesting computing device and other intermediate computing devices in the chain of communication between the map tile server and the requesting computing device to cache the requested map tiles. When a new map tile is designated for downloading to the requesting computing device, the map tile version identifier of the map tile is updated in response to rerendering the map tile. The map search server and/or the map tile server then provide the updated map tile version identifier to the requesting computing device. As a result, the updated map tile version identifier in the URI for the map tile causes the requesting computing device (and the intermediate computing devices) to download and cache the rerendered map tile again.

Other information related to the map tile to be downloaded may also be included in a portion of the URI (e.g., the path portion), such as information that identifies a zoom level of the map tile and a position of the map tile within the zoom level (e.g., in an x-y coordinate space). In addition, the URI can include an identifier for a type of tile (also referred to as a layer) to be downloaded, such as a street map tile, a topographical map tile, a satellite/aerial image tile, or a road overlay map tile. For example, the street map tiles may be designated by "layer=m@" in the URI http://map.example.com/tiles/layers=m@123000076&x=5278&y=12718&z=15. The "x," "y," and "z" name-value pairs include the x-y coordinates and the zoom level of the street map tile, respectively.

The map tile server 126 or another system can combine additional layer information with the street map tile. The map tile server 126 may then send the combined tile to the requesting computing device. In some implementations, the map tile server 126 and/or the other server can combine the street map tile and the additional layer information prior to receiving the request for the combined tile and store the combined tile. The map tile server 126 may then retrieve the stored combined tile and send the stored combined tile to the requesting computing device.

For example, the computing device can send a request for map tiles that includes the URI http://map.example.com/tiles/layers=m@123000076,bike&x=5278&y=12718&z=15. The identifier ",bike" is appended to the individual tile version identifier to indicate that the computing device has requested that the map tile server 126 provide a street map tile combined with a bike path tile.

In another example, the computing device can send a request for tiles that includes the URI http://map.example.com/tiles/layers=t@127,r@159000083&x=5278&y=12718&z=15. The bulk tile version identifier "t@127" and the individual tile version identifier "r@159000083" indicate that the computing device has requested that the map tile server 126 provide a terrain or topological tile combined with a road overlay tile. The terrain tiles may be raster or bitmap graphics, while the road overlay tiles may be vector graphics with a transparent background. The transparent background allows each terrain tile to show through a corresponding overlay road tile. In some implementations, the system 100 uses only bulk version identifiers to identify terrain tiles for download to the computing device 120.

The map search server 116 and/or the map tile server 126 can provide instructions to the computing device 120 to overlay at least one tile on top of another tile. The computing device 120 then receives the overlay tile and the other tile, and uses the instructions to present the overlay tile on top of the other tile. The computing device 120 then presents the combination of the overlay tile and the other tile in the graphical user interface 200 as one of the map tiles **204*a*-1. For example, the computing device 120 can send a first request for a particular individual version identifier of a road overlay tile using the URI http://map.example.com/tiles/layers=h@162000054&x=5278&y=12718&z=15. The computing device 120 can send a second request for a particular bulk version identifier of a satellite or aerial image tile using the URI http://map.example.com/tiles/layers=v@102&x=5278&y=12718&z=15. The tiles may have the same x, y, and z values corresponding to the same location within the map. The satellite image tiles may be raster or bitmap graphics, while the road overlay tiles may be vector graphics with a transparent background. Again, the transparent background allows each satellite image tile to show through a corresponding overlay road tile. In some implementations, the system 100 uses only bulk version identifiers to identify satellite image tiles for download to the computing device 120**.

The system 100 may distribute the map tiles across multiple map tile servers having domain names such as "map1.example.com" and "map2.example.com." The map search server 116 and/or the map tile server 126 may then provide the domain name of a particular map tile server, for example, to provide for load balancing in the system 100 and/or a shorter network path to the particular map tile server than the map tile server 126. In some implementations, the system 100 includes separate map tile servers for one or more of the layers. For example, the system 100 may store the satellite image tiles at a first map tile server or set of map tile servers, and the road overlay tiles at a second map tile server or set of map tile servers.

The graphical user interface 200 includes controls that allow a user to interact with the map area 202. For example, the graphical user interface 200 may include a search control 206 that can receive a search query input from a user, such as the search query "Sunnydale, Calif." The graphical user interface 200 provides the search query to the map search server 116. The map search server 116 determines that the search query includes a city of "Sunnydale" and a state of "CA" or "California." The map search server 116 and/or the map tile server 126 identify the version identifiers for the map tiles around the identified location and provides the version identifiers to the computing device 120. The computing device 120 then sends one or more requests to the map tile server 126 for the map tiles having the version identifiers.

The graphical user interface 200 also includes a pan control 208 and a zoom level control 210. A user can make an input using the pan control 208 or another type of input, such as with arrow keys on a keyboard or by clicking and dragging the map area 202 with a pointing device, to pan to the map area 202 to the left, right, up, or down. A user can make an input using the zoom level control 210 or another type of input, such as by double clicking on the map area 202 with a pointing device, to zoom to another zoom level in the map area 202. The graphical user interface 200 includes instructions that receive the inputs and pans or zooms the map area 202 to a new position or zoom level within the map. In response, the graphical user interface 200 sends a request to the map tile server 126 for additional tiles that are located at the new position and/or zoom level.

In some implementations, the instructions retrieve map tiles around a currently displayed set of map tiles prior to receiving an input requesting that the map area 202 be panned to that surrounding area. For example, a map search server and/or a map tile server can provide the graphical user interface 200 with instructions to download map tiles outside the map area 202 in addition to the map tiles 204*a*-1 displayed in the map area 202. Accordingly, the map search server and/or the map tile server provides map tile version identifiers in the instructions for the graphical user interface 200.

Figure 2B:
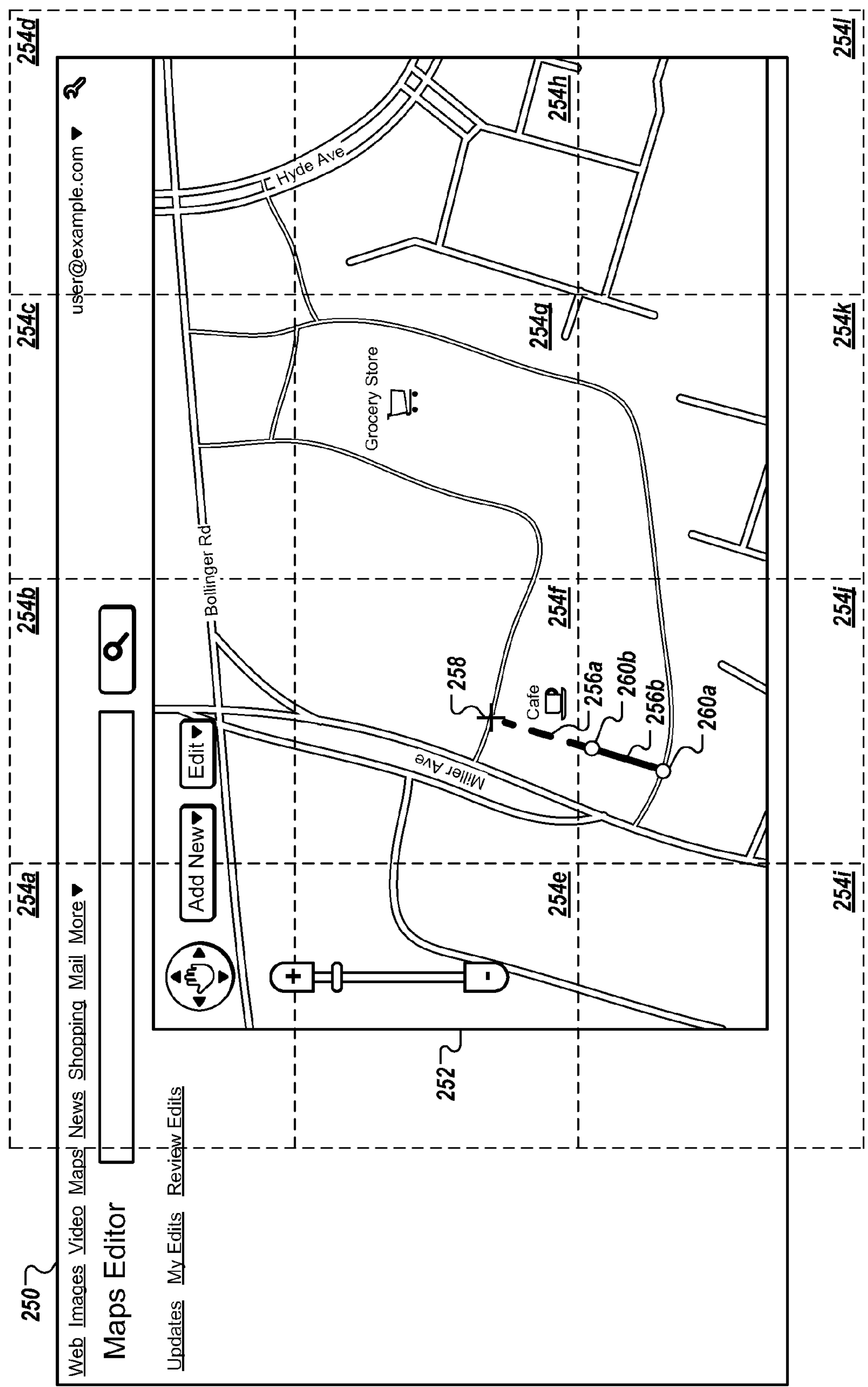
FIG. 2B shows an example of a graphical user interface for updating map tiles.

FIG. 2B shows an example of a graphical user interface 250 for updating map tiles. The graphical user interface 250 is a web page provided by a map search service, such as the map search server 116 shown in FIG. 1. The graphical user interface 250 includes a map area 252. The map area 252 presents at least a portion of one or more map tiles 254*a*-1 that make up a map, such as a same map as is presented in the graphical user interface 200 of FIG. 2A. The dotted lines represent the full extent of each of the map tiles 254*a*-1, but only the portion of each of the map tiles 254*a*-1 that is within the map area 252 is presented to a user in the graphical user interface 250. Like the graphical user interface 200 of FIG. 2A, the graphical user interface 250 includes instructions for downloading the map tiles 254*a*-1 from a map tile server, such as the map tile server 126. The graphical user interface 250 may receive the instructions for downloading the map tiles 254*a*-1 from the approval system 108.

The graphical user interface 250 also includes instructions for displaying the temporary display objects 132, shown in FIG. 1. The graphical user interface 250 may receive the instructions from the approval system 108. The instructions direct the graphical user interface 250 to receive user inputs that include updates to features in geospatial information that describes the map. The instructions also direct the graphical user interface 250 to overlay one or more temporary display objects on the map that represent the updates to the features. For example, the graphical user interface 250 can place multiple line segments 256*a*-*b* on the map in response to user inputs received by a pointer 258. In particular, the graphical user interface 250 can receive user inputs made with the pointer 258 that specify multiple vertexes 260*a*-*b* of the line segments 256*a*-*b*. The line segments 256*a*-*b* represent updates to a feature, such as a road, in geospatial information that describes the map. The user inputs may also include other information about the feature, such as the type of road, the name of the road, and directions of traffic flow on the road. The graphical user interface 250 may also receive updates to other types of features, such as other types of linear features (e.g., a bicycle path), polygons (e.g., a park boundary), or place markers (e.g., a business).

In addition to overlaying the line segments 256*a*-*b* on the map for the updates, the graphical user interface 250 sends the updates to an approval system, such as the updates 110 sent by the computing device 112 to the approval system 108. The approval system 108 reviews the updates and, if approved, the updates are used to rerender one or more tiles from the map. The approval system 108 or another part of the system 100, such as the map tile server 126, provides the computing device 112 with one or more individual tile version identifiers and instructions for replacing the line segments 256*a*-*b*, the map tile 254*f*, and the map tile 254*j* with the individually rerendered map tiles.

The computing device 112 includes the individual tile version identifiers in the request 136 to the map tile server 126 for the individually rerendered map tiles. The map tile server 126 provides the individual rerendered instances of map tiles 138 to the computing device 112 in response to the request 136. The computing device 112 then uses the individual rerendered instances of map tiles 138 to replace the corresponding temporary display objects that represented the updates in the individual rerendered instances of map tiles 138. For example, the graphical user interface 250 may replace the line segments 256*a*-*b*, the map tile 254*f*, and the map tile 254*j* with the map tile 204*f* and the map tile 204*j* of FIG. 2A.

Figure 3A:
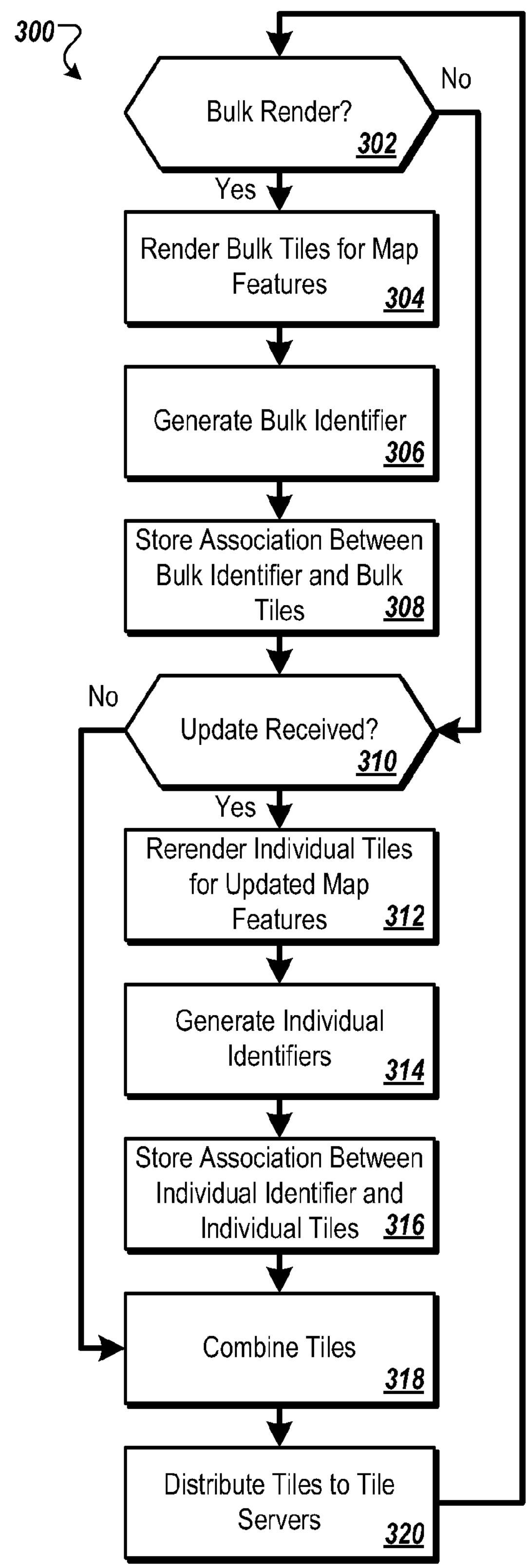
FIG. 3A is flow chart that shows an example of a process for managing updates to map tiles.

FIG. 3A is flow chart that shows an example of a process 300 for managing updates to map tiles. The process 300 may be performed, for example, by a system such as the system 100, the graphical user interface 200, and the graphical user interface 250. For clarity of presentation, the description that follows uses the system 100, the graphical user interface 200, and the graphical user interface 250 as examples for describing the process 300. However, another system, or combination of systems, may be used to perform the process 300.

At step 302, if a bulk rendering is not scheduled to occur, then the process 300 proceeds to step 310. For example, the bulk tile renderer 104 may schedule a bulk rendering of map tiles every few days or weeks. In another example, the bulk tile renderer 104 may schedule a next bulk rendering of the map tiles in response to completing a previous bulk rendering. At step 302, if a bulk rendering is scheduled to occur, then, at step 304, map tiles are rendered in bulk based on geospatial information that describes a map. The rendering generates a bulk rendered instance of each of the map tiles. For example, the bulk tile renderer 104 may render map tiles in bulk using the features in the map feature database 106 and store the bulk rendered map tiles in the map tile storage 102.

At step 306, a bulk version identifier is generated that uniquely identifies the bulk rendered instance of each of the tiles. For example, the bulk tile renderer 104 may generate the sequentially incrementing number representing the current iteration (e.g., “123”) of bulk rendered map tiles.

At step 308, the bulk version identifier and an association between the bulk version identifier and the bulk rendered instance of each of the map tiles is stored. For example, the bulk tile renderer 104 may store the bulk version identifier and an association between the bulk version identifier and the current instance of the bulk rendered map tiles in the map tile storage 102.

At step 310, if an update to a feature in the geospatial information is received, then, at step 312, at least one of the map tiles are rerendered based on the update to generate an individual rerendered instance of the map tile. The tile represents a portion of the map affected by the update to the feature in the geospatial information. For example, the individual tile renderer 114 may rerender one or more of the current instance of the bulk rerendered map tiles based on the updates to the features in the map feature database 106.

At step 314, a tile version identifier is generated that uniquely identifies the individual rerendered instance of the tile. The tile version identifier may be generated relative to the bulk version identifier that was generated prior to generating the tile version identifier. For example, the individual tile renderer 114 may generate a tile version identifier of "123000076" for the rerendered instance of the map tile, where the "123" portion represents the bulk version from which the individual instance is rendered and the "000076" portion is the individual tile version relative to the bulk version.

At step 316, the tile version identifier and an association between the tile version identifier and the individual rerendered instance of the map tile are stored. For example, the individual tile renderer 114 may store the tile version identifier and an association between the tile version identifier and the individual rerendered instance of the map tile in the map tile storage 102.

At step 318, each of the bulk rendered tiles and the individual rerendered instance of the tile are combined with corresponding ones of another set of map tiles and are stored. For example, the map tile server 126 may combine each of the road map tiles with a corresponding one of the bike trail tiles.

At step 320, the bulk rendered tiles, the individual rerendered instance of the tile, and the combined tiles are distributed to map tile servers. For example, the system 100 may distribute the road map tiles (including bulk rendered tiles and one or more individual rerendered tiles) and the road map tiles combined with the bike trail tiles to multiple map tile servers or multiple map tile storage systems that are accessible by the map tile servers.

Figure 3B:
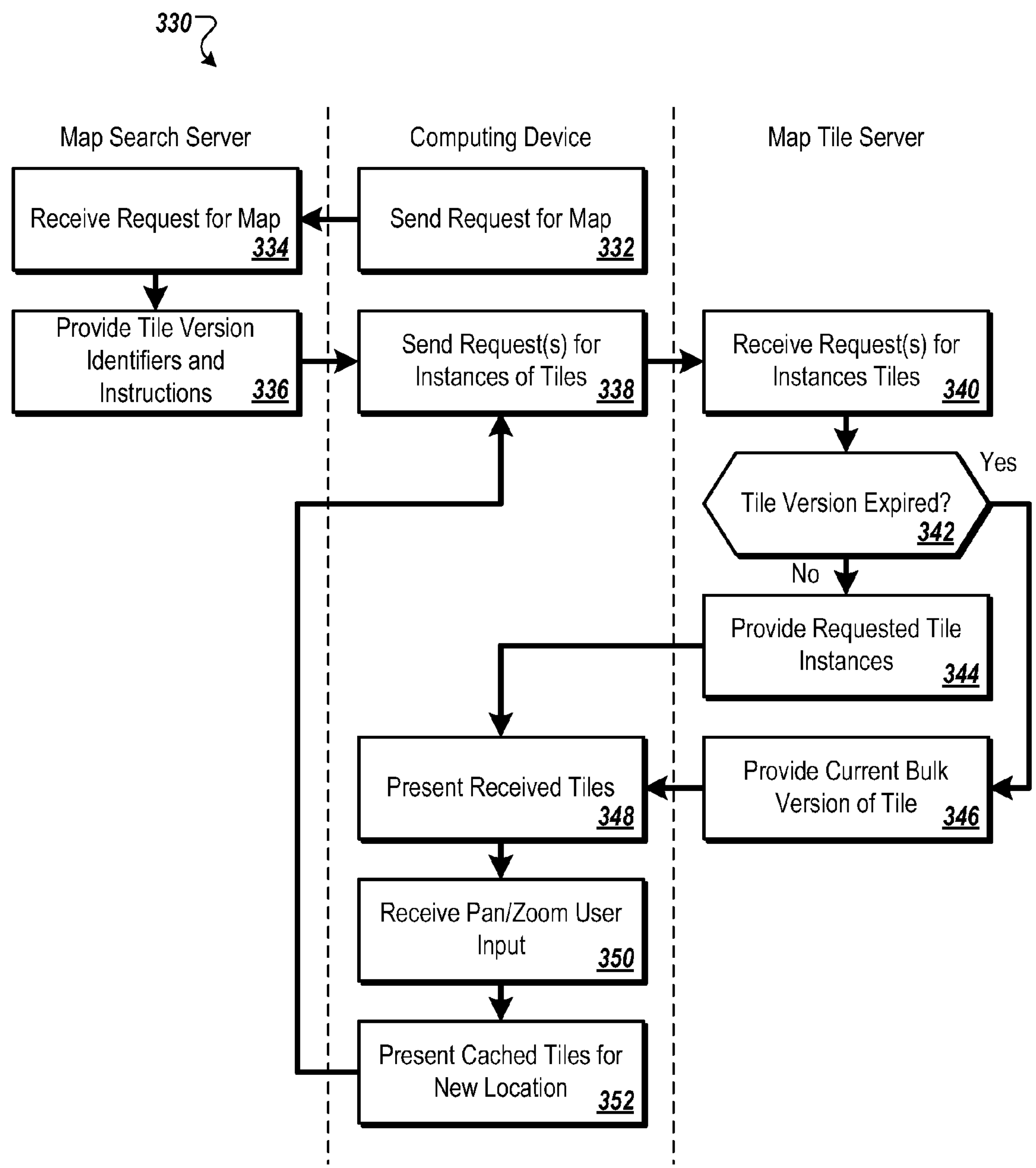
FIG. 3B is flow chart that shows an example of a process for accessing map tiles.

FIG. 3B is flow chart that shows an example of a process 330 for accessing map tiles. The process 330 may be performed, for example, by a system such as the system 100, the graphical user interface 200, and the graphical user interface 250. For clarity of presentation, the description that follows uses the system 100, the graphical user interface 200, and the graphical user interface 250 as examples for describing the process 330. However, another system, or combination of systems, may be used to perform the process 330.

At step 332, a computing device sends a request to provide at least a portion of a map for display within a viewing area of a user interface at the computing device. For example, the computing device 120 can send a general search query with location related terms or a location search query to the map search server 116.

At step 334, the request to provide the portion of the map is received and map tiles for the portion of the map are identified. For example, the map search server 116 may receive the search query. The map search server 116 performs a search using the search query that identifies a location within the map and, correspondingly, map tiles at the location.

At step 336, one or more tile version identifiers and instructions for using the tile version identifiers to send one or more requests for individual rerendered instances of one or more of the map tiles are provided to the computing device. One or more bulk version identifiers and instructions for using the bulk version identifiers to send one or more requests for bulk rendered instances of one or more of the map tiles may also provided to the computing device. For example, the map search server 116 can provide a tile version identifier of "m@12300076" for an individually rerendered instance of a first map tile and a bulk version identifier of "m@123000000" for a bulk rendered instance of a second map tile.

In some implementations, the process 330 may include providing, to the computing device, additional tile and/or bulk version identifiers for one or more of the tiles around the tile and outside of the viewing area of the user interface at the computing device. The process 330 may also include providing instructions for using the additional tile and/or bulk version identifiers to send requests for the one or more of the tiles around the tile, such as when the user pans or zooms to a new portion of the map.

In some implementations, the process 330 may include providing multiple individual and/or bulk version identifiers for each location, such as when the request for the portion of the map requests multiple types or layers of map information. For example, the computing device 120 may send a request for both street map and bicycle path information, or satellite images and roads to be displayed together. Accordingly, the map search server 116 may provide individual and/or bulk tile version identifiers for each set of map information (e.g., version identifiers for street map tiles and for bicycle path tiles, or version identifiers for satellite image tiles and for road tiles).

At step 338, the computing device sends one or more requests for map tiles using the received tile version identifiers. At step 340, the requests for the map tiles are received. The request may also include tile version identifiers for one or more other tiles from one or more other maps. For example, the map tile server 126 can receive requests that include version identifiers for street map tiles, for street map tiles and bicycle path tiles, or for satellite image tiles and road tiles. In some implementations, one or more types or layers of tiles may be served by another system. For example, a system dedicated to serving satellite image tiles may the satellite image tiles for the requests to display satellite image tiles and road tiles together, while the map tile server 126 serves the road tiles for the requests.

At step 342, it is determined whether at least a threshold amount of time has passed after the generation of one or more individual rerendered instances of tiles that are being requested by the computing device. If the threshold amount of time has not passed, then, at step 344, the requested individual rerendered instances of the tiles are provided to the computing device. Otherwise, if the threshold amount of time has passed, then, at step 346, corresponding bulk rendered instances of the tiles are provided to the computing device rather than the requested individual rerendered instances of the tiles. For example, the map tile server 126 may provide map tiles from a most recent bulk rendering of the tiles in response to a request for individually rerendered tiles that were rendered more than the threshold amount of time, e.g., before the current time. In another example, the threshold amount of time may be the time at which the next bulk rendering of the map tiles occurs or is made available to computing devices, such as the computing device 120.

In some implementations, the process 330 may include determining whether at least a bulk threshold amount of time has passed after the generation of one or more bulk rendered instances of tiles that are being requested by the computing device. If the bulk threshold amount of time has not passed, then, the requested bulk rendered instances of the tiles are provided to the computing device. Otherwise, if the bulk threshold amount of time has passed, then, corresponding bulk rendered instances of the tiles from a most recent or current bulk rendering are provided to the computing device rather than the requested bulk rendered instances of the tiles.

At step 348, the computing device presents the received map tiles. For example, the computing device 120 may present the map tiles 204*a*-1 in the map area 202 of the graphical user interface 200. The instructions provided to the computing device at step 336, or another set of instructions, may include directions for displaying a combination of tiles. Each of the map tiles 204*a*-1 in the graphical user interface

200 may be a combination of multiple tiles. For example, the request for a map tile may include multiple tile version identifiers. Accordingly, the map tile server 126, may combine the map tiles for the multiple tile version identifiers and provide the combined tile to the computing device 120, such as in the case of a road map tile combined with a bicycle path tile. In another example, the instructions from the map search server 116 may include instructions that, when executed by the computing device 120, overlay tiles with transparent backgrounds, such as street tiles, over other tiles, such as satellite image tiles. The result may be that the transparent tiles and the other tiles appear to be combined to a user of the computing device 120.

At step 350, the computing device receives one or more user inputs that request panning and/or zooming of the displayed map. The instructions provided to the computing device at step 336, or another set of instructions, may include directions for requesting additional map tiles that are not currently displayed within the graphical user interface at the computing device. The additional map tiles form a cache of stored map tiles at the computing device. In response to receiving the panning and/or zooming user inputs, at step 352, the computing device presents any cached map tiles that correspond to the new map location being presented with the graphical user interface after panning and/or zooming the map.

The process 330 returns to step 338, where the computing device sends a request for additional map tiles. The additional map tiles may include tiles for the new location being displayed that were not already in the cache and/or map tiles to be added to the cache. In some implementations, the computing device provides the new location being displayed to the map search server 116 and/or the map tile server 126. The map search server 116 and/or the map tile server 126 then provides a list of tile version identifiers for the new location. The list may include bulk and/or individual tile version identifiers. The list may include tile version identifiers for cached map tiles. The list may also include tile version identifiers for multiple types or layers of map tiles.

Figure 3C:
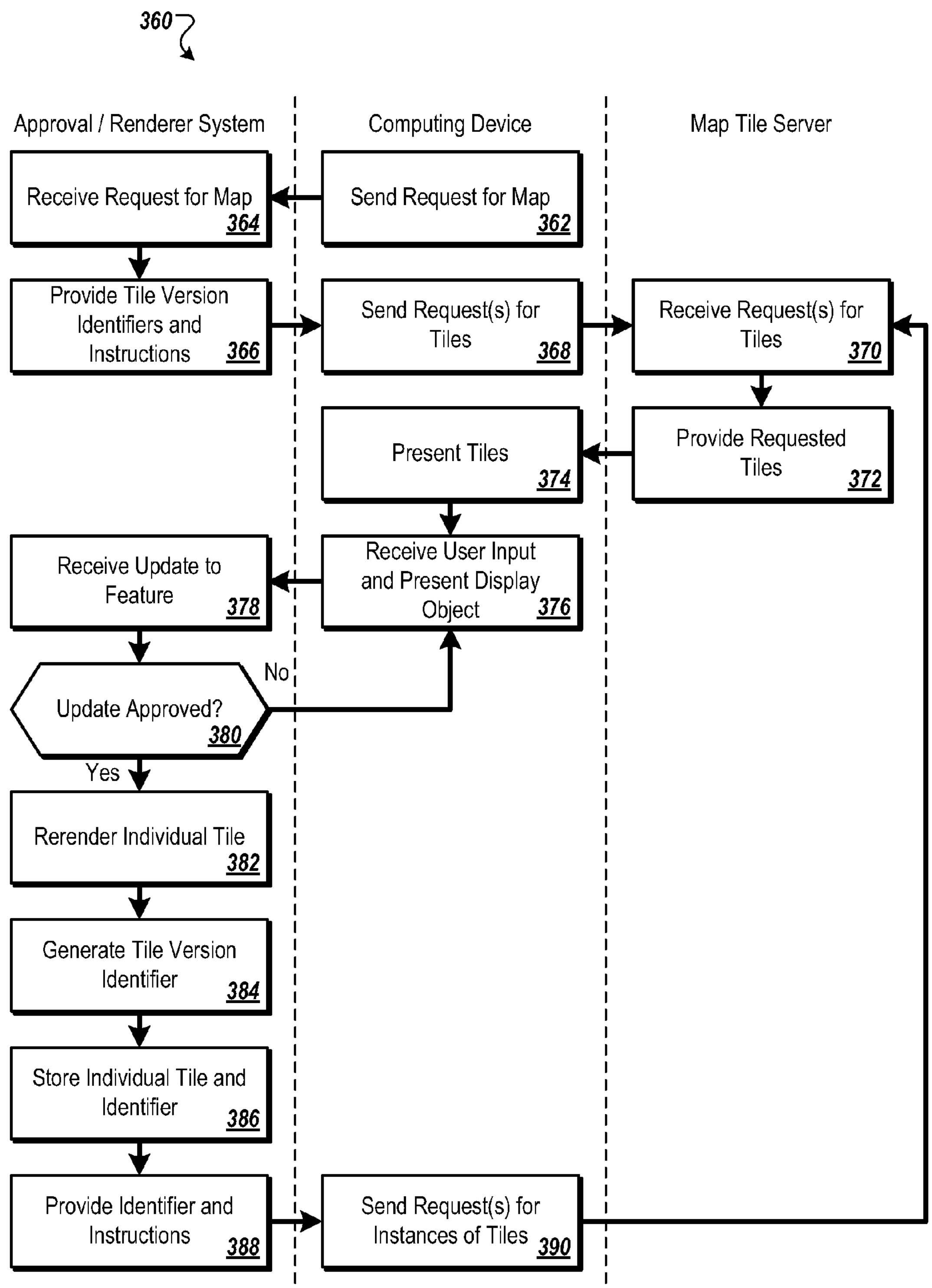
FIG. 3C is flow chart that shows an example of a process for updating map tiles.

FIG. 3C is flow chart that shows an example of a process 360 for updating map tiles. The process 360 may be performed, for example, by a system such as the system 100, the graphical user interface 200, and the graphical user interface 250. For clarity of presentation, the description that follows uses the system 100, the graphical user interface 200, and the graphical user interface 250 as examples for describing the process 360. However, another system, or combination of systems, may be used to perform the process 360.

At step 362, a computing device sends a request to a map tile approval and/or renderer system to display and edit a portion of a map. For example, the computing device 112 can send a request to the approval system 108 to display and edit a map.

At step 364, the request to display and edit the map is received. At step 366, tile version identifiers are provided to the computing device, as well as instructions for receiving a user input that includes an update to a feature in geospatial information that describes a map and for overlaying a temporary display object on the map that represents the update to the feature in response to receiving the user input. For example, the approval system 108 may provide the tile version identifiers and the instructions to the computing device 112.

At step 368, the computing device sends one or more requests for instances of map tiles to a map tile server using the tile version identifiers. At step 370, the map tile server receives the requests and in response, at step 372, provides the requested instances of the map tiles to the computing device. At step 374, the computing device presents the instances of the map tiles. For example, the computing device 112 may present the map tiles 254*a*-1 in the graphical user interface 250.

At step 376, the computing device receives one or more user inputs representing an update to a feature in geospatial information for the map. Updating a feature may include an action, such as adding a new feature, removing an existing feature, or modifying an existing feature. For example, the computing device 112 may receive user inputs in the map area 252 with the pointer 258 that add a new road to the geospatial information. In response to receiving the user inputs, the computing device uses the instructions to present one or more temporary display objects that represent the update to the feature in the geospatial information. In addition, the computing device uses the instructions to provide the update to the approval and/or renderer system.

At step 378, the update to the feature is received. At step 380, if the update to the feature is approved, then, at step 382, at least one tile from the tiles is rerendered based on the update to generate an individual rerendered instance of the tile. The tile represents a portion of the map affected by the update to the feature in the geospatial information. For example, the approval system 108 may approve the update 110 and store the update 110 in the map feature database 106. The individual tile renderer 114 then rerenders the tiles affected by the update 110, such as the map tile 254*f* and the map tile 254*j*.

At step 384, a tile version identifier is generated that uniquely identifies the individual rerendered instance of the tile. For example, the individual tile renderer 114 may generate an individual tile version identifier for the individual rerendered instances of the map tile 254*f* and the map tile 254*j*.

At step 386, the tile version identifier and an association between the tile version identifier and the individual rerendered instance of the tile are stored in a data storage. For example, the individual tile renderer 114 may store the individual rerendered instances of the map tile 254*f* and the map tile 254*j* and the association with the individual tile version identifier in the map tile storage 102.

At step 388, the tile version identifier and instructions for using the tile version identifier to send a request for the individual rerendered instance of the tile and to replace the temporary display object with the individual rerendered instance of the tile are provided to the computing device. For example, the approval system 108 can provide the individual tile version identifier to the computing device 112 as well as the instructions for replacing the line segments 256*a*-*b*, the map tile 254*f*, and the map tile 254*j* with corresponding ones of the map tile 204*f* and the map tile 204*j*. The instructions for using a tile version identifier to replace the temporary display object and the updated map tiles may be provided, for example, in step 388 or in step 366.

At step 390, the computing device sends a request for the individual rerendered instance of the tile using the tile version identifier. At step 370, the request for the individual rerendered instance of the tile is received and, at step 372, the individual rerendered instance of the tile is provided to the computing device. At step 374, the computing device receives the individual rerendered instance of the tile and presents the individual rerendered instance of the tile, including replacing the temporary display object and the existing map tile that corresponds to the individual rerendered instance of the tile.

Figure 4:
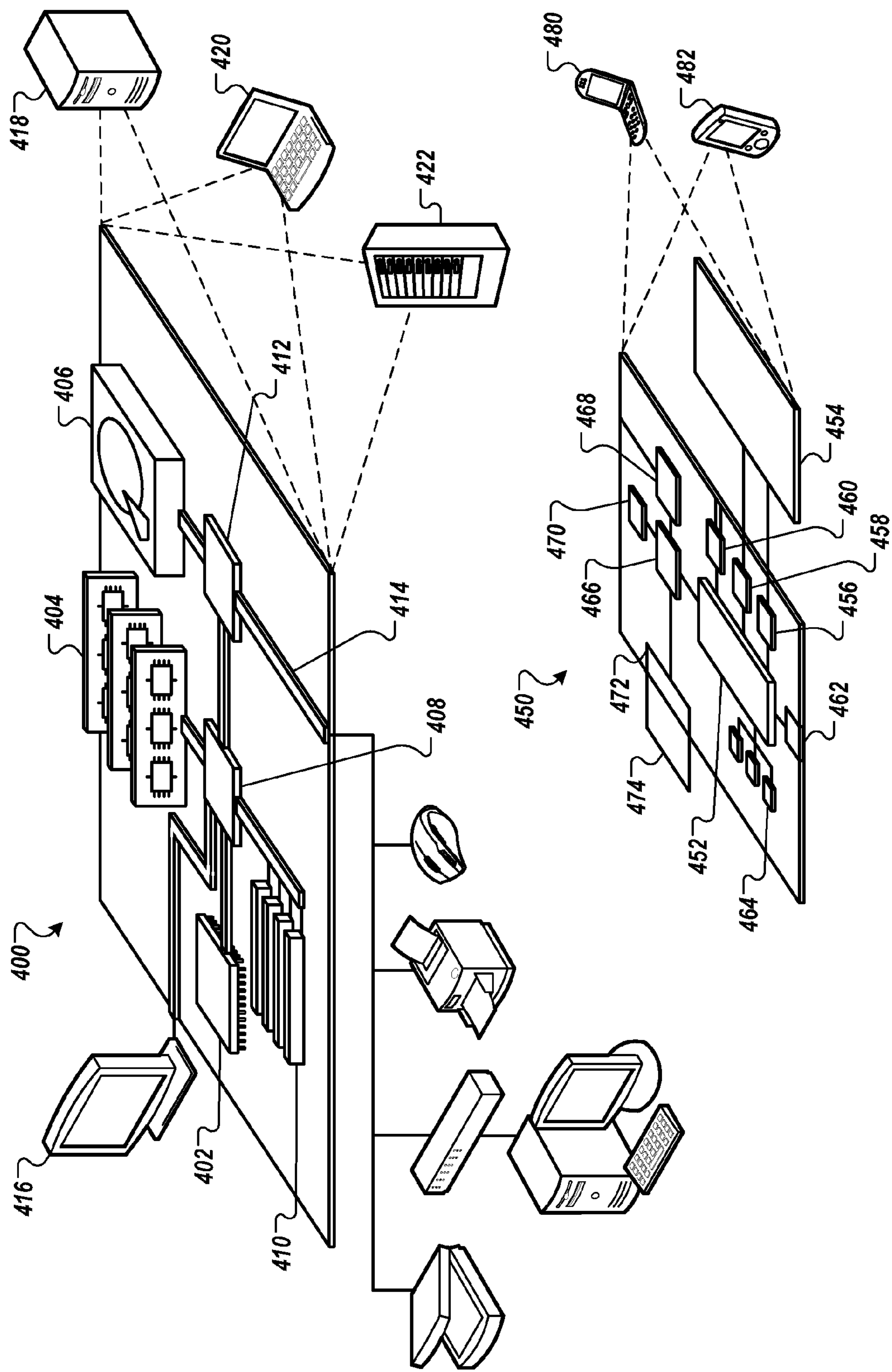
FIG. 4 is a schematic diagram that shows an example of a computing device and a mobile computing device.

FIG. 4 is a schematic diagram that shows an example of a computing device 400 and an example of a mobile computing device that can be used to implement the systems and techniques described here. The computing device 400 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations.

A computer program product can be tangibly embodied in an information carrier. The computer program product may contain instructions that, when executed, perform one or more methods, such as those described above. The computer program product can also be tangibly embodied in a computer- or machine-readable medium, such as the memory 404, the storage device 406, or memory on the processor 402.

The high-speed interface 408 manages bandwidth-intensive operations for the computing device 400, while the low-speed interface 412 manages lower bandwidth-intensive operations. Such allocation of functions is exemplary only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 418, or multiple times in a group of such servers. In addition, it may be implemented in a personal computer such as a laptop computer 420. It may also be implemented as part of a rack server system 422. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. The memory 464 may include, for example, flash memory and/or NVRAM memory (non-volatile random access memory).

An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provide as a security module for the mobile computing device 450, and may be programmed with instructions that permit secure use of the mobile computing device 450. In addition, secure applications may be provided via the SIMM cards, along with additional information, such as placing identifying information on the SIMM card in a secure manner.

In some implementations, a computer program product is tangibly embodied in an information carrier. The computer program product contains instructions that, when executed, perform one or more methods, such as those described above. The computer program product can be a computer- or machine-readable medium, such as the memory 464, the expansion memory 474, or memory on the processor 452. In some implementations, the computer program product can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, Wi-Fi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method for accessing map tiles, the method comprising:

receiving, by one or more computing devices, a first request from a computing device for a portion of a map, wherein the portion of the map includes combined map tiles that are a combination of corresponding ones of first map tiles from a first type of map and second map tiles from a second type of map, and wherein the first map tiles from the first type of map include bulk rendered map tiles and one or more individual rerendered map tiles, the one or more individual rerendered map tiles comprising one or more corresponding bulk rendered map tiles modified based on map feature updates;

providing, by the one or more computing devices, first tile version identifiers and second tile version identifiers to the computing device in response to receiving the first request, wherein each of the first tile version identifiers uniquely identifies an instance of one of the first map tiles and each of the second tile version identifiers uniquely identifies an instance of one of the second map tiles;

providing, by the one or more computing devices, instructions to the computing device for using the first tile version identifiers and the second tile version identifiers to request the combined map tiles;

receiving, by the one or more computing devices, one or more second requests from the computing device for the combined map tiles using the first tile version identifiers and the second tile version identifiers;

providing, by the one or more computing devices, the combined map tiles to the computing device in response to receiving the second requests;

combining, by the one or more computing devices, the corresponding ones of the first map tiles and the second map tiles to generate the combined map tiles; and determining, by the one or more computing devices, that at least a threshold amount of time has passed after generating the individual rerendered map tiles;

wherein combining the corresponding ones of the first map tiles and the second map tiles comprises combining one or more corresponding ones of the bulk rendered map tiles rather than the individual rerendered map tiles with the second map tiles in response to determining that the threshold amount of time has passed.

2. The method of claim 1, wherein the first tile version identifiers each include a bulk tile version identifier and an individual tile version identifier.

3. The method of claim 1, wherein providing the instructions for using the first tile version identifiers and the second tile version identifiers to request the combined map tiles comprises providing instructions to include the first tile version identifiers and the second tile version identifiers in corresponding path portions of web addresses in the second requests.

4. The method of claim 1, further comprising providing instructions to the computing device for displaying the combination of the corresponding ones of the first map tiles and the second map tiles.

5. The method of claim 4, further comprising:

determining that at least a threshold amount of time has passed after generating the individual rerendered map tiles; and wherein providing the instructions for displaying the combination of the corresponding ones of the first map tiles with the second map tiles comprises providing instructions for displaying the combination of one or more corresponding ones of the bulk rendered map tiles rather than the individual rerendered map tiles with the second map tiles in response to determining that the threshold amount of time has passed.

6. The method of claim 1, further comprising providing additional first tile version identifiers of the first map tiles and additional second tile version identifiers of the second map tiles to the computing device for one or more additional combined map tiles around the combined map tiles and instructions for using the additional first tile version identifiers and the additional second tile version identifiers to request the additional combined map tiles.

7. The method of claim 1, further comprising distributing the first map tiles and the second map tiles to multiple map tile servers.

8. A computer-implemented system for accessing map tiles, the system comprising:

one or more data storages that store combined map tiles that are a combination of corresponding ones of first map tiles from a first type of map and second map tiles from a second type of map, and wherein the first map tiles from the first type of map include bulk rendered map tiles and one or more individual rerendered map tiles, the one or more individual rerendered map tiles comprising one or more corresponding bulk rendered map tiles modified based on map feature updates;

a first interface that receives a first request from a computing device for a portion of a map that includes the combined map tiles;

a map server that provides first tile version identifiers and second tile version identifiers to the computing device in response to receiving the first request, and provides instructions to the computing device for using the first tile version identifiers and the second tile version identifiers to request the combined map tiles, wherein each of the first tile version identifiers uniquely identifies an instance of one of the first map tiles and each of the second tile version identifiers uniquely identifies an instance of one of the second map tiles;

a second interface that receives one or more second requests from the computing device for the combined map tiles using the first tile version identifiers and the second tile version identifiers;

a map tile server that provides the combined map tiles to the computing device in response to receiving the second requests; and a tile renderer that combines the corresponding ones of the first map tiles and the second map tiles to generate the combined map tiles;

wherein the tile renderer determines that at least a threshold amount of time has passed after generating the individual rerendered map tiles, and combines one or more corresponding ones of the bulk rendered map tiles rather than the individual rerendered map tiles with the second map tiles in response to determining that the threshold amount of time has passed.

9. The system of claim 8, wherein the first tile version identifiers each include a bulk tile version identifier and an individual tile version identifier.

10. The system of claim 1, wherein the map server provides instructions to include the first tile version identifiers and the second tile version identifiers in corresponding path portions of web addresses in the second requests.

11. The system of claim 8, wherein the map server provides instructions to the computing device for displaying the combination of the corresponding ones of the first map tiles and the second map tiles.

12. The system of claim 11, wherein the map server determines that at least a threshold amount of time has passed after generating the individual rerendered map tiles, and provides instructions for displaying the combination of one or more corresponding ones of the bulk rendered map tiles rather than the individual rerendered map tiles with the second map tiles in response to determining that the threshold amount of time has passed.

13. The system of claim 8, further comprising:

multiple map tile servers that provide the combined map tiles to the computing device in response to receiving one or more second requests for the combined map tiles using the first tile version identifiers and the second tile version identifiers; and a tile renderer that distributes the first map tiles and the second map tiles to the map tile servers.

14. A non-transitory computer-readable medium storing instructions that when executed cause a computer to perform operations, the operations comprising:

receiving a first request from a computing device for a portion of a map, wherein the portion of the map includes combined map tiles that are a combination of corresponding ones of first map tiles from a first type of map and second map tiles from a second type of map, and wherein the first map tiles from the first type of map include bulk rendered map tiles and one or more individual rerendered map tiles, the one or more individual rerendered map tiles comprising one or more corresponding bulk rendered map tiles modified based on map feature updates;

providing first tile version identifiers and second tile version identifiers to the computing device in response to receiving the first request, wherein each of the first tile version identifiers uniquely identifies an instance of one of the first map tiles and each of the second tile version identifiers uniquely identifies an instance of one of the second map tiles;

providing instructions to the computing device for using the first tile version identifiers and the second tile version identifiers to request the combined map tiles;

receiving one or more second requests from the computing device for the combined map tiles using the first tile version identifiers and the second tile version identifiers;

providing the combined map tiles to the computing device in response to receiving the second requests;

combining the corresponding ones of the first map tiles and the second map tiles to generate the combined map tiles; and determining that at least a threshold amount of time has passed after generating the individual rerendered map tiles;

wherein combining the corresponding ones of the first map tiles and the second map tiles comprises combining one or more corresponding ones of the bulk rendered map tiles rather than the individual rerendered map tiles with the second map tiles in response to determining that the threshold amount of time has passed.

* * * * *